(12) United States Patent
Alharbi et al.

(10) Patent No.: US 10,544,867 B2
(45) Date of Patent: Jan. 28, 2020

(54) SPECTACLE BLINDS SWINGING DEVICE

(71) Applicant: Saudi Arabian Oil Company, Dhahran (SA)

(72) Inventors: Bandar Bjad Alharbi, Mubarraz (SA); Fahad Abdallah Alharthi, Mubarraz (SA)

(73) Assignee: Saudi Arabian Oil Company, Dhahran (SA)

( * ) Notice: Subject to any disclaimer, the term of this patent is extended or adjusted under 35 U.S.C. 154(b) by 81 days.

(21) Appl. No.: 15/797,709

(22) Filed: Oct. 30, 2017

(65) Prior Publication Data
US 2019/0128430 A1 May 2, 2019

(51) Int. Cl.
| F16L 55/10 | (2006.01) |
| F16K 3/312 | (2006.01) |
| F16K 31/60 | (2006.01) |
| F16K 31/53 | (2006.01) |

(52) U.S. Cl.
CPC .............. *F16K 3/312* (2013.01); *F16K 31/53* (2013.01); *F16K 31/60* (2013.01); *F16L 55/10* (2013.01)

(58) Field of Classification Search
CPC .......... F16K 3/312; F16K 31/53; F16K 31/30; F16L 55/10
USPC ........................ 138/94, 94.3, 94.5
See application file for complete search history.

(56) References Cited

U.S. PATENT DOCUMENTS

| 1,633,161 | A |   | 6/1927 | Cavenagh |   |
| 1,998,081 | A | * | 4/1935 | Gerlich | F16K 3/10 |
|   |   |   |   |   | 138/94.5 |
| 2,011,767 | A | * | 8/1935 | Juengling | F16K 3/10 |
|   |   |   |   |   | 138/94.5 |
| 2,271,282 | A | * | 1/1942 | Young | F16K 3/312 |
|   |   |   |   |   | 138/94.3 |
| 2,339,970 | A | * | 1/1944 | Young | F16K 3/312 |
|   |   |   |   |   | 138/44 |
| 2,462,493 | A | * | 2/1949 | Hamer | F16K 3/312 |
|   |   |   |   |   | 138/44 |
| 2,462,494 | A |   | 2/1949 | Hamer |   |
| 2,635,643 | A | * | 4/1953 | Hamer | F16K 3/312 |
|   |   |   |   |   | 138/94.5 |
| 2,789,582 | A | * | 4/1957 | Dunham | F16K 3/312 |
|   |   |   |   |   | 138/94.3 |
| 2,861,599 | A |   | 11/1958 | Hamer |   |

(Continued)

OTHER PUBLICATIONS

International Search Report and Written Opinion for International Application No. PCT/US2018/056368; International Filing Date Oct. 17, 2018: Report dated Dec. 11, 2018; (pp. 1-11).

*Primary Examiner* — James F Hook
(74) *Attorney, Agent, or Firm* — Bracewell LLP; Constance G. Rhebergen; Douglas W. Rommelmann

(57) ABSTRACT

A swinging device for spectacle blinds where the swinging device includes a case having a pair of side members connected to a bottom member and first and second shafts rotatably connected to the case. A first gear mounted on the first shaft engages a second gear mounted on the second shaft. A drive handle assembly is connected to the first shaft to impart rotation of the first shaft. A spectacle blind holder is mounted on an end of the second shaft. The spectacle blind holder is arranged and designed to securely hold the spectacle blind. A base assembly has an upper portion connected to the case and a lower portion for mounting to piping.

17 Claims, 3 Drawing Sheets

(56) References Cited

U.S. PATENT DOCUMENTS

| | | | |
|---|---|---|---|
| 3,165,124 A | | 1/1965 | Ausburn |
| RE26,238 E | * | 7/1967 | Snell .................. F16K 3/312 |
| | | | 138/94.3 |
| 3,351,099 A | * | 11/1967 | Shindler ............. F16K 3/312 |
| | | | 138/94.5 |
| 4,178,836 A | * | 12/1979 | Maisonneuve ....... E01B 35/00 |
| | | | 91/381 |
| 4,343,332 A | | 8/1982 | Williams |
| 4,452,278 A | | 6/1984 | Quinn |
| 4,671,324 A | * | 6/1987 | Neill ................... B25B 27/16 |
| | | | 138/44 |
| 5,303,742 A | | 4/1994 | Junier |
| 5,582,211 A | | 12/1996 | Monson |
| 2017/0030470 A1 | * | 2/2017 | Al-Amri ............. F16K 3/0227 |

* cited by examiner

SPECTACLE BLINDS SWINGING DEVICE

CROSS-REFERENCE TO RELATED APPLICATIONS

Not applicable.

BACKGROUND OF THE INVENTION

1. Field of the Invention

The present invention relates generally to spectacle blinds, and more particularly to a device for moving large spectacle blinds between first and second operational positions.

2. Description of the Related Art

Spectacle blinds have been used in piping runs for many years. As shown in FIG. 1, the spectacle blind 10 has two circular discs—one disc 12 is solid and the other disc 14 has a full opening 16. The full opening 16 is typically sized to match the inside diameter of the flanges that it is designed to be used with. The two discs have the same outside diameter 18 sized to fit within the bolting circle of the flanges it is to be used with. The two discs 12 and 14 are joined to one another by a web 20. Typically, the centers 12C and 14C of the circular discs 12 and 14, respectively, lie on a common line 10L passing through the longitudinal axis of the web 20. The two circular discs 12 and 14 joined by the web 20 give the appearance of a pair of spectacles—thus, the name spectacle blind.

The spectacle blind 10 is installed in piping between two flanges. Neither of the two circular discs 12 and 14 are drilled with bolt holes, but instead are sized to fit inside the bolting circle of the mating flanges. The full opening disc 14 is inserted between the two flanges for full flow through the piping run and the solid disc 12 is inserted between the two flanges to block or isolate the section of line when it needs to be inspected or removed from service.

Spectacle blinds are typically used in piping systems that need to be separated from other installations. The spectacle blind is usually permanently installed in the piping system and rotated as needed. Normally, the spectacle blind is mounted in the open position so that flow through the pipe is possible and rotated to the closed position to prevent flow, as for example to perform maintenance. One benefit of the spectacle blind is that it provides visual confirmation as to whether the flow through the flanged connection is open or closed.

The size and weight of spectacle blinds depends on the flange size and pressure class. In the past some spectacle blinds had a hole in the web through which one of the bolts of the flanged connection passed and formed a pivot point about which the spectacle blind could be rotated when the majority of other flange bolts were removed. However, the larger size, higher pressure spectacle blinds weigh hundreds of pounds and can even weigh more than a thousand pounds. Typically, such large, heavy spectacle blinds do not use the flange bolt technique to rotate but instead require the use of a crane.

It is desirable to be able to reposition large, heavy spectacle blinds from open to closed position and from closed to open position without the use of a crane. It is desirable to be able to have a portable device that can rotate large, heavy spectacle blinds between open and closed positions. It is further desirable to have a manually-operated portable device that can rotate large, heavy spectacle blinds between open and closed positions.

SUMMARY OF THE INVENTION

The present invention relates to a swinging device for a spectacle blind. A preferred embodiment of the invention includes case having first and second shafts mounted to and within the case. The shafts are supported by anti-friction bearings for smooth rotation. Each shaft has at least one gear mounted on it and the gear(s) on the second shaft engage the gear(s) on the first shaft. A drive handle assembly connects to an end of the first shaft. A blind holder is mounted to an end of the second shaft. The blind holder is arranged and designed to secure the spectacle blind to the swinging device. When the drive handle assembly is rotated, the first shaft rotates and the engaged gears cause the second shaft to rotate, which results in rotation of the blind holder.

The preferred embodiment of the swinging device also includes a base assembly comprising a bolted clamp for mounting the swinging device to the pipe on one side of the spectacle blind. An upper portion of the base assembly is connected to the case. In operation, with the flange bolts removed from the flanges, the drive handle assembly is manually turned to swing the spectacle blind from a first position to a second position (open to closed or vice versa). Even for 10-inch diameter pipe sizes and larger, the swinging device is relatively small and can be lifted and mounted, even at high elevations, without using a crane. The swinging device can swing spectacle blinds of size 10" and above without the need of a crane.

BRIEF DESCRIPTION OF THE SEVERAL VIEWS OF THE DRAWINGS

So that the manner in which the recited features, advantages and aspects of the embodiments of the present invention are attained and can be understood in detail, a more particular description of the invention may be had by reference to the preferred embodiments thereof which are illustrated in the appended drawings, which drawings are incorporated as a part hereof. It is noted however, that the appended drawings illustrate only typical embodiments of this invention and are therefore not to be considered limiting of its scope, for the invention may admit to other equally effective embodiments.

DESCRIPTION OF THE PREFERRED EMBODIMENTS

Figure 1:
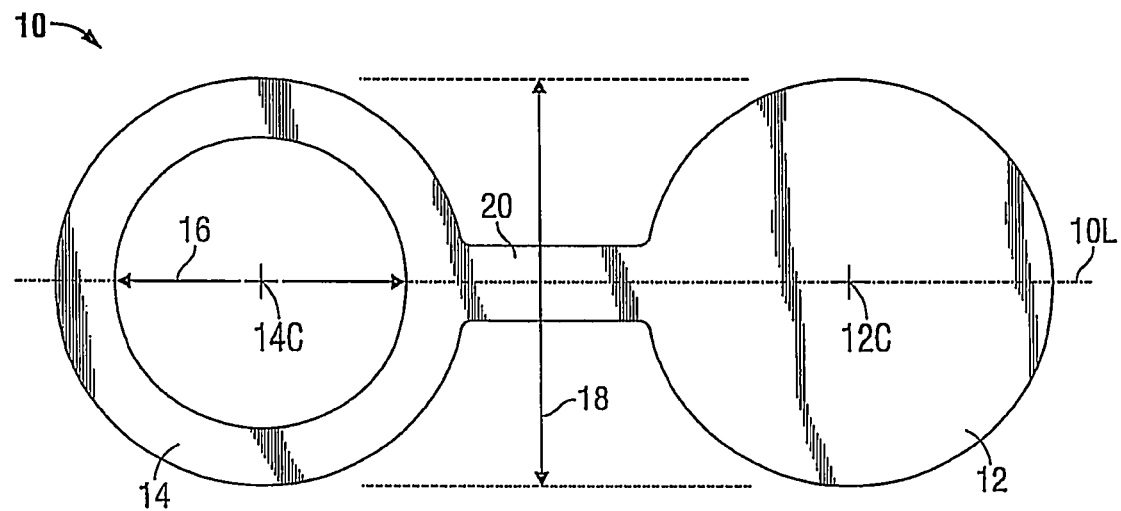
FIG. 1 is a front view of a spectacle blind.

While this invention is susceptible of embodiments of many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 4:
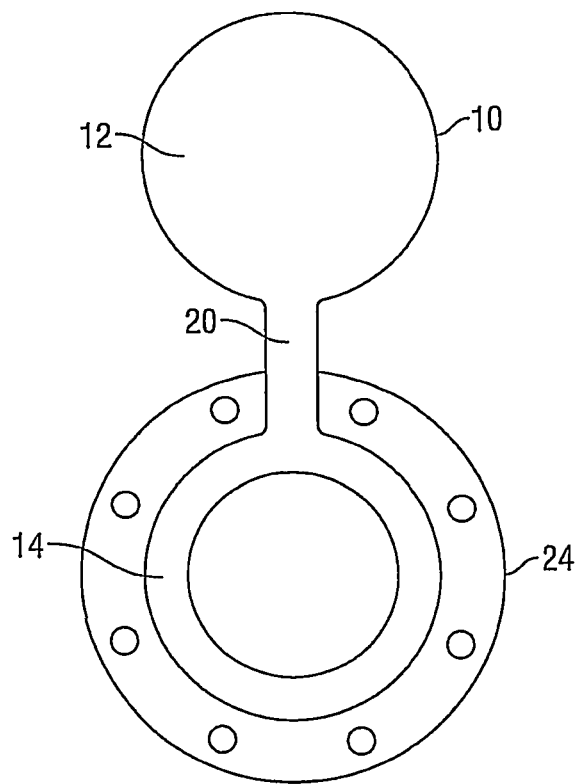
FIG. 4 is a front view of a spectacle blind showing the spectacle blind in its open position adjacent to a flange.
Figure 2:
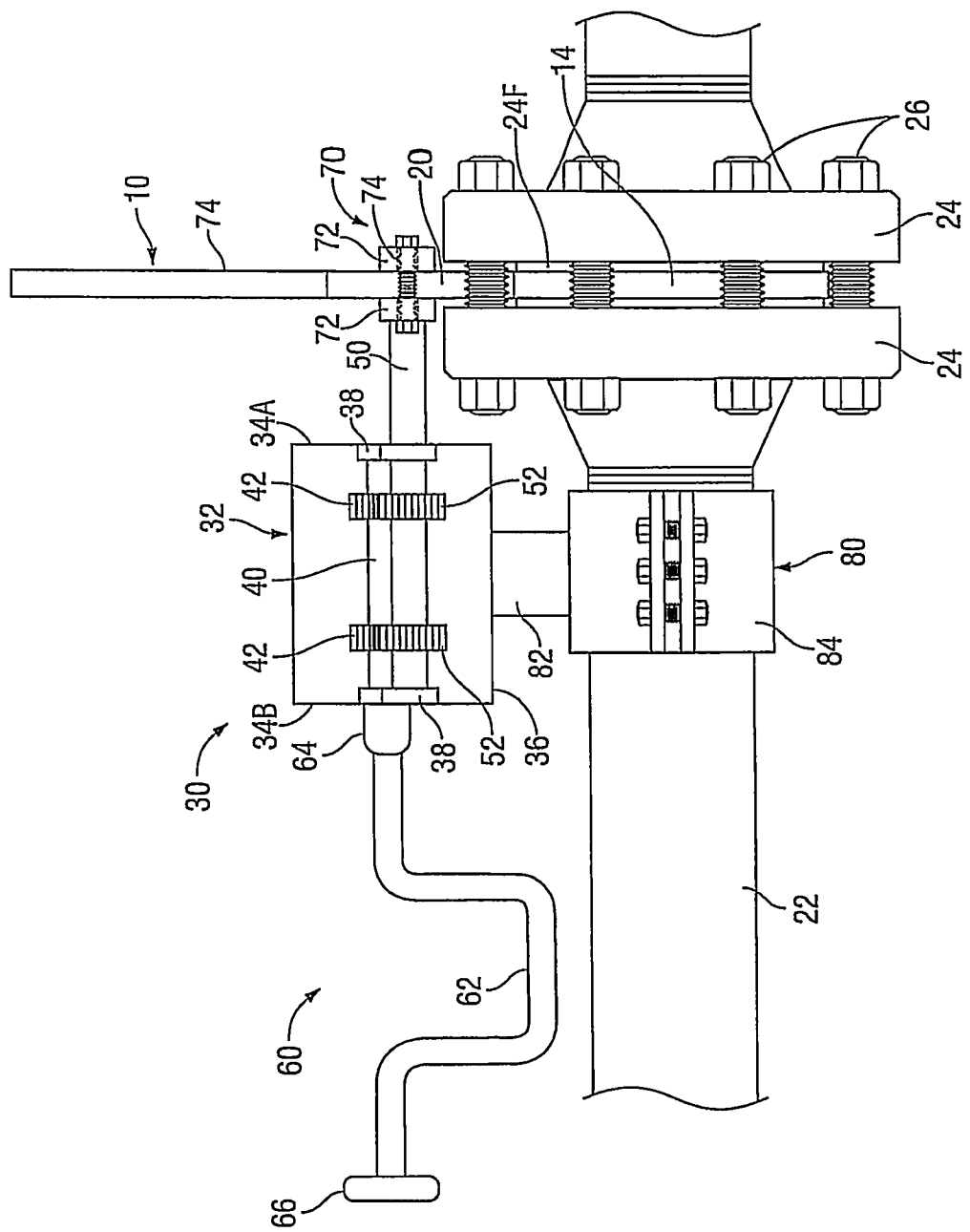
FIG. 2 is an elevation view of the swinging device according to a preferred embodiment of the present invention, the swinging device connected to a spectacle blind installed between a pair of flanges in a piping run.
Figure 3:
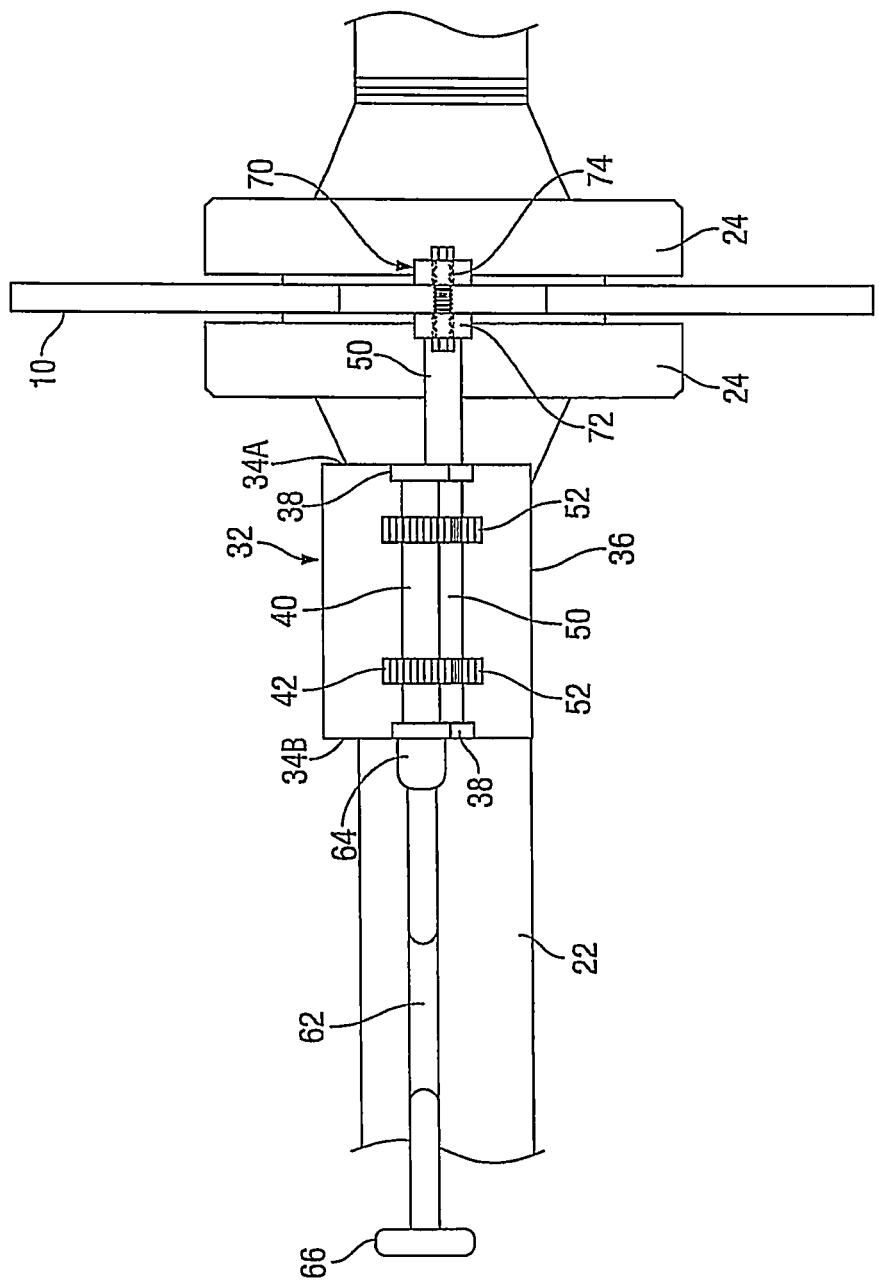
FIG. 3 is a plan view of the swinging device of FIG. 2 showing the flange bolts removed and the spectacle blind rotated 90° from its position in FIG. 2.

A swinging device 30 according to a preferred embodiment of the invention is shown in FIGS. 2 and 3 mounted on a pipe 22 and connected to a spectacle blind 10 positioned between two flanges 24. As shown in FIG. 2, the spectacle blind 10 is secured between the pair of flanges 24 with a plurality of fasteners 26, typically stud bolts and nuts. The outer diameter 18 (FIG. 1) of the circular full opening disc 14 and the solid disc 12 is preferably slightly larger than the raised face 24F of the flanges 24 and slightly less than the inner diameter of the bolting circle as shown in FIG. 2. The spectacle blind 10 is shown in FIG. 2 as being oriented vertically with solid disc 12 vertically above the full opening disc 14. FIG. 4 also shows a spectacle blind 10 oriented vertically and in the open position adjacent to a flange 24. It is to be understood that the swinging device 30 will also work with spectacle blinds oriented in other positions.

FIG. 3 shows the flange fasteners 26 removed and the spectacle blind 10 has been rotated 90°, from its position in FIG. 2, by the swinging device 30. It is to be understood that the spectacle blind 10 will be rotated another 90° to be positioned in the closed position.

Referring to FIGS. 2 and 3, the swinging device 30 includes a case 32 having a pair of side members 34 (a front side member 34A and a back side member 34B) connected to a generally rectangular bottom member 36. It is to be understood that the case 32 preferably also has left and right sides and a top but they have been omitted for clarity.

A first shaft 40 and a second shaft 50 extend transversely relative to the front and back side members 34A and 34B, respectively, and both are rotatably mounted to the pair of side members 34A and 34B, preferably via bearings 38. Preferably, the bearings 38 are anti-friction bearings 38 allowing for smooth rotation of the shafts 40 and 50. In the preferred embodiment, the shafts 40 and 50 are mounted to the case 32 parallel with one another.

At least one first gear 42 is mounted on the first shaft 40 and at least one second gear 52 is mounted on the second shaft 50. In the preferred embodiment shown in FIG. 2, two first gears 42 and two second gears 52 are mounted on the first and second shafts 40 and 50, respectively. The second gear(s) 52 engages with the first gear(s) 42. It is to be understood that in elevation view of FIG. 2, the first shaft 40 and first gears 42 are partially hidden from view by the second shaft 50 and second gears 52. In the preferred embodiment, the first shaft 40 is mounted to the case 32 slightly higher than the second shaft 50 for reasons which will be discussed below.

A drive handle assembly 60 is connected, preferably releasably connected, to the first shaft 40 to impart rotation to the first shaft 40. The drive handle assembly 60 is located outside of the case 32 adjacent the back side member 34B. In the preferred embodiment, the drive handle assembly 60 is similar to an old fashioned carpenter's brace used to drill holes in wood. The drive handle assembly 60 includes a generally U-shaped handle 62, a front portion 64 arranged and designed to connect to an end of the first shaft 40, and a rear knob 66. The U-shaped handle 62 is a kind of crank and gives the drive handle assembly 60 a great amount of torque and a low rotational speed. Elevating the mounting of the first shaft 40 to the case 32 provides additional height between the first shaft 40 and the pipe 22. The additional height provides clearance for the height of the U-shaped handle 62 and a worker's hand to pass by the pipe 22 when rotating the spectacle blind 10.

Although not shown, it may be desirable that the drive handle assembly 60 includes a three position ratcheting mechanism which allows ratcheting of the U-shaped handle 62 when in tight spots. A first position allows ratcheting in a clockwise direction, a second position allows ratcheting in a counter-clockwise direction, and a third position prohibits any ratcheting effect. Such ratcheting mechanisms are commonly known and understood to those skilled in the art.

A spectacle blind holder 70 is mounted on an end of the second shaft 50. The spectacle blind holder 70 is located outside of the case 32 adjacent the front side member 34A, oppositely of the drive handle assembly 60. The spectacle blind holder 70 is arranged and designed to secure the spectacle blind 10 to the swinging device 30 at the web 20. As shown in FIGS. 2 and 3, the spectacle blind holder 70 may comprise a pair of plates 72 having a hole 74 near each end of the plates 72. The spacing of the holes 74 in the plates 72 is greater than the width of the web 20 such that the web 20 can be positioned between the pair of holes 74 of each plate 72 and bolts inserted through the holes 74 can then be drawn tight with nuts to capture the web 20 between the pair of plates 72.

As shown in FIG. 2, the swinging device 30 includes a base assembly 80 having an upper portion 82 connected to the case 32 and a lower portion 84 for mounting to the pipe 22. The lower portion 84 preferably comprises a bolted clamp, for example a saddle clamp, for mounting the swinging device 30 to the pipe 22 on one side of the spectacle blind 10. The upper portion 82 is preferably a structural support member, for example a short section of pipe, that has one end affixed to the lower portion 84 and a second end affixed to the case 32.

With a spectacle blind 10 installed between two flanges 24 as shown in FIG. 2, the swinging device 30 is installed by positioning the spectacle blind holder plate 72 attached to the second shaft 50 into abutting contact with the web 20 of the spectacle blind 10 with the base assembly 80 positioned on the pipe 22. The spectacle blind holder plate 72 should be substantially transverse to the web 20 such that the holes 74 in the plate 72 are not obstructed by the web 20. The drive handle assembly 60 may be used to properly orient the plate 72 as rotation of the U-shaped handle 62 rotates the first shaft 40 which rotates the second shaft 50, which in turn rotates the attached spectacle blind holder plate 72. The second plate 72 can then be aligned with the first plate 72 and threaded fasteners can be tightened to secure the web 20 to the spectacle blind holder 70. The clamp 84 of the base assembly 80 is tightened with bolts to secure the swinging device 30 to the pipe 22.

In operation, with the flange bolts 26 removed from the flanges 24 and the spectacle blind 10 connected to the swinging device 30 mounted securely to the pipe 22 on one side of the spectacle blind 10, the drive handle assembly 60 is connected to the first shaft 40 and manually turned to swing the spectacle blind 10 from a first position to a second position (open to closed or vice versa). Upon reaching the desired positioning of the spectacle blind 10 between the flanges 24, the stud bolts and nuts 26 may be re-installed in the flanges 24 and tightened.

It is to be understood that the swinging device 30 is mounted to the pipe 22 on only one side of the spectacle blind 10. The swinging device 30 is compact and removable, if desired. Even for 10-inch diameter pipe sizes and larger, the swinging device 30 is relatively small and can be lifted and mounted, even at high elevations, without using a crane. The swinging device can swing spectacle blinds of size 10" and above without the need of a crane.

It is to be understood that the embodiments shown and described are preferred embodiments and the invention is not limited to these disclosed embodiments. It is to be further understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims. While the specific embodiments have been illustrated and described, numerous modification come to mind without significantly departing from the spirit of the invention, and the scope of protection is only limited by the scope of the accompanying claims.

We claim:

1. A portable, removable swinging device for a spectacle blind having two discs joined by a web, the swinging device comprising:
    a case having a pair of side members connected to a bottom member;
    a first shaft rotatably connected to the case;
    a second shaft rotatably connected to the case;
    at least one first gear mounted on the first shaft;
    at least one second gear mounted on the second shaft, wherein the at least one second gear engages the at least one first gear;
    a drive handle assembly connected to the first shaft;
    a spectacle blind holder mounted on an end of the second shaft, wherein the spectacle blind holder is arranged and designed to be releasably secured to the spectacle blind to allow removal of the swinging device independent of the spectacle blind; and
    a base assembly having an upper portion connected to the case and a lower portion for mounting to a pipe.

2. The swinging device of claim 1, further comprising a plurality of bearings for rotatably connecting the first shaft to the pair of side members and for rotatably connecting the second shaft to the pair of side members of the case.

3. The swinging device of claim 2, wherein the lower portion of the base assembly comprises a bolted clamp for securing the swinging device to the pipe on one side of the spectacle blind.

4. The swinging device of claim 2, wherein the drive handle assembly includes a U-shaped handle providing torque when rotated.

5. The swinging device of claim 2, wherein the pair of side members comprises a front side member and a back side member, and the drive handle assembly is outside the case adjacent the back side member and the spectacle blind holder is outside the case adjacent the front side member.

6. The swinging device of claim 1, wherein the lower portion of the base assembly comprises a bolted clamp for securing the swinging device to the pipe on one side of the spectacle blind.

7. The swinging device of claim 1, wherein the drive handle assembly includes a U-shaped handle providing torque when rotated.

8. The swinging device of claim 1, wherein the spectacle blind holder comprises:
    a pair of plates, each plate having a hole near each end of the plates, one plate mounted to an end of the second shaft, and threaded fasteners inserted through the holes in the plates to secure the plates to one another,
    wherein the spacing of the holes in the plates is greater than the width of the web such that the web can be positioned between the pair of plates and between the pair of holes of each plate and threaded fasteners inserted through the holes may be drawn tight to secure the spectacle blind between the pair of plates.

9. The swinging device of claim 1, wherein
    the at least one first gear mounted on the first shaft comprises two first gears mounted on the first shaft,
    the at least one second gear mounted on the second shaft comprises two second gears mounted on the second shaft,
    wherein the two second gears engage the two first gears.

10. The swinging device of claim 1, wherein the pair of side members comprises a front side member and a back side member, and the drive handle assembly is outside the case adjacent the back side member and the spectacle blind holder is outside the case adjacent the front side member.

11. A swinging device for a spectacle blind having two discs joined by a web, the swinging device comprising:
    a case;
    a first shaft;
    a second shaft;
    a plurality of bearings for rotatably connecting the first and second shafts to the case;
    a first gear mounted on the first shaft;
    a second gear mounted on the second shaft,
    wherein the second gear engages the first gear;
    a handle connected to the first shaft;
    a spectacle blind holder mounted on an end of the second shaft, wherein the spectacle blind holder comprises:
        a pair of plates, each plate having a hole near each end of the plates, one plate mounted to an end of the second shaft, and threaded fasteners inserted through the holes in the plates to secure the plates to one another, and
        wherein the spacing of the holes in the plates is greater than the width of the web such that the web can be positioned between the pair of plates and between the pair of holes of each plate and threaded fasteners inserted through the holes may be drawn tight to secure the spectacle blind between the pair of plates; and
    a base assembly connected to the case and having a clamp for mounting to a pipe.

12. The swinging device of claim 11, wherein the handle is a U-shaped handle providing torque when rotated.

13. The swinging device of claim 11, wherein the case has a front side and a back side and the handle is outside the case adjacent the back side and the spectacle blind holder is outside the case adjacent the front side.

14. The swinging device of claim 11, wherein the base assembly comprises a clamp for securing the swinging device on the pipe on one side of the spectacle blind.

15. A swinging device for a spectacle blind having two discs joined by a web, the two discs each having an outside diameter greater than a width of the web, the swinging device comprising:
    a case having front and back side members connected to a bottom member;
    a first shaft rotatably connected to the case;
    a second shaft rotatably connected to the case;
    a first gear mounted on the first shaft between the front and back side members;
    a second gear mounted on the second shaft between the front and back side members, the second gear engaging the first gear;
    a drive handle assembly connected to the first shaft, the drive handle assembly located adjacent the back side member oppositely of the front side member;
    a spectacle blind holder mounted on an end of the second shaft, the spectacle blind holder located adjacent the front side member oppositely of the back side member; and a base assembly having an upper portion connected to the case and a lower portion for releasably mounting on a pipe.

16. The swinging device of claim 15, wherein the lower portion of the base assembly comprises a clamp for securing the swinging device on the pipe only to one side of the spectacle blind.

17. The swinging device of claim 15, wherein the spectacle blind holder is arranged and designed to be releasably secured to the spectacle blind.

* * * * *